(12) United States Patent
Hoxworth et al.

(10) Patent No.: US 11,176,595 B2
(45) Date of Patent: Nov. 16, 2021

(54) SYSTEMS AND METHODS FOR STAGING CUSTOMER PREMISE EQUIPMENT OF A TELECOMMUNICATIONS NETWORK

(71) Applicant: Level 3 Communications, LLC, Broomfield, CO (US)

(72) Inventors: William D. Hoxworth, Westminster, CO (US); David D. Hughes, Aurora, CO (US); Terrence J. Cuny, Rutland, MA (US)

(73) Assignee: Level 3 Communications, LLC, Broomfield, CO (US)

( * ) Notice: Subject to any disclaimer, the term of this patent is extended or adjusted under 35 U.S.C. 154(b) by 598 days.

(21) Appl. No.: 15/492,176

(22) Filed: Apr. 20, 2017

(65) Prior Publication Data

US 2017/0345082 A1    Nov. 30, 2017

Related U.S. Application Data

(60) Provisional application No. 62/340,860, filed on May 24, 2016, provisional application No. 62/361,363, filed on Jul. 12, 2016.

(51) Int. Cl.
    *G06Q 30/06*        (2012.01)
    *H04L 12/24*        (2006.01)
    (Continued)

(52) U.S. Cl.
    CPC ....... *G06Q 30/0635* (2013.01); *G06F 9/4411* (2013.01); *G06Q 10/087* (2013.01);
    (Continued)

(58) Field of Classification Search
    CPC ......... G06Q 30/0635; G06Q 10/08345; G06Q 10/087; G06F 94/411; H04L 41/0806; H04L 41/0869
    (Continued)

(56) References Cited

U.S. PATENT DOCUMENTS 5,831,853 A    11/1998   Bobrow et al.
7,177,825 B1    2/2007    Borders
(Continued)

FOREIGN PATENT DOCUMENTS

CA      2568741 A1 *   5/2007         H04N 21/6118

OTHER PUBLICATIONS

Business/Technology Editors 1998, Cayman Systems' Zero-Configuration DSL Customer Premise Equipment Sweeps Through SUPERCOMM '98, New York. (Year: 1998).*
(Continued)

*Primary Examiner* — Matthew E Zimmerman
*Assistant Examiner* — Latasha D Ramphal

(57) ABSTRACT

An order for telecommunications services is received comprising order parameters including a CPE device configuration request for a customer network. A warehouse is selected as a staging location based upon the order parameters, available inventory of the CPE device, and shipping information from the warehouse to the customer network. A bay of a rack at the staging location is selected to stage a CPE device that matches the specifications of the CPE device configuration request. The CPE device is validated by verifying hardware of the CPE device and whether the CPE device is loaded with certain predetermined software. A configuration is executed to the CPE device to provide the telecommunication services according to the order parameters. The configuration is saved and the CPE device is prepared for installation at a customer location. The CPE device may be shipped to the customer network using the order parameters and shipping information.

23 Claims, 5 Drawing Sheets

(51) Int. Cl.
*G06F 9/4401* (2018.01)
*G06Q 10/08* (2012.01)

(52) U.S. Cl.
CPC ... *G06Q 10/08345* (2013.01); *H04L 41/0806* (2013.01); *H04L 41/0869* (2013.01)

(58) Field of Classification Search
USPC .................................................. 705/26–27
See application file for complete search history.

(56) References Cited

U.S. PATENT DOCUMENTS

| | | |
|---|---|---|
| 2002/0161863 A1 | 10/2002 | McGuire |
| 2003/0028624 A1 | 2/2003 | Hasan et al. |
| 2003/0177159 A1 | 9/2003 | Li et al. |
| 2004/0047320 A1 | 3/2004 | Eglin |
| 2006/0050862 A1* | 3/2006 | Shen ............... H04Q 3/0062 379/219 |
| 2006/0090080 A1 | 4/2006 | Pearson et al. |
| 2007/0115962 A1* | 5/2007 | Mammoliti ......... H04L 41/0869 370/389 |
| 2007/0124216 A1* | 5/2007 | Lucas ................. G06Q 30/02 705/26.1 |
| 2008/0059782 A1 | 3/2008 | Kruse et al. |
| 2009/0132682 A1* | 5/2009 | Counterman ....... H04L 41/0886 709/220 |
| 2011/0213729 A1 | 9/2011 | Pechanec et al. |
| 2011/0276302 A1* | 11/2011 | Rivoir .............. G01R 31/31903 702/117 |
| 2013/0232035 A1 | 9/2013 | Stijen |
| 2015/0127412 A1* | 5/2015 | Kothandaraman ......... G06Q 30/0635 705/7.26 |
| 2015/0331894 A1* | 11/2015 | Barron ................ G06F 16/1837 707/622 |
| 2016/0171438 A1* | 6/2016 | Ladden ................ G06T 7/0004 715/741 |

OTHER PUBLICATIONS

International Preliminary Report on Patentability, dated Nov. 27, 2018, Int'l Appl. No. PCT/US17/028506, Int'l Filing Date Apr. 20, 2017; 11 pgs.

International Search Report dated Jul. 10, 2017, Int'l Appl. No. PCT/US17/028506, Int'l Filing Date Apr. 20, 2017; 3 pgs.

Written Opinion of the International Searching Authority dated Jul. 10, 2017, Int'l Appl. No. PCT/US17/028506, Int'l Filing Date Apr. 20, 2017; 9 pgs.

* cited by examiner

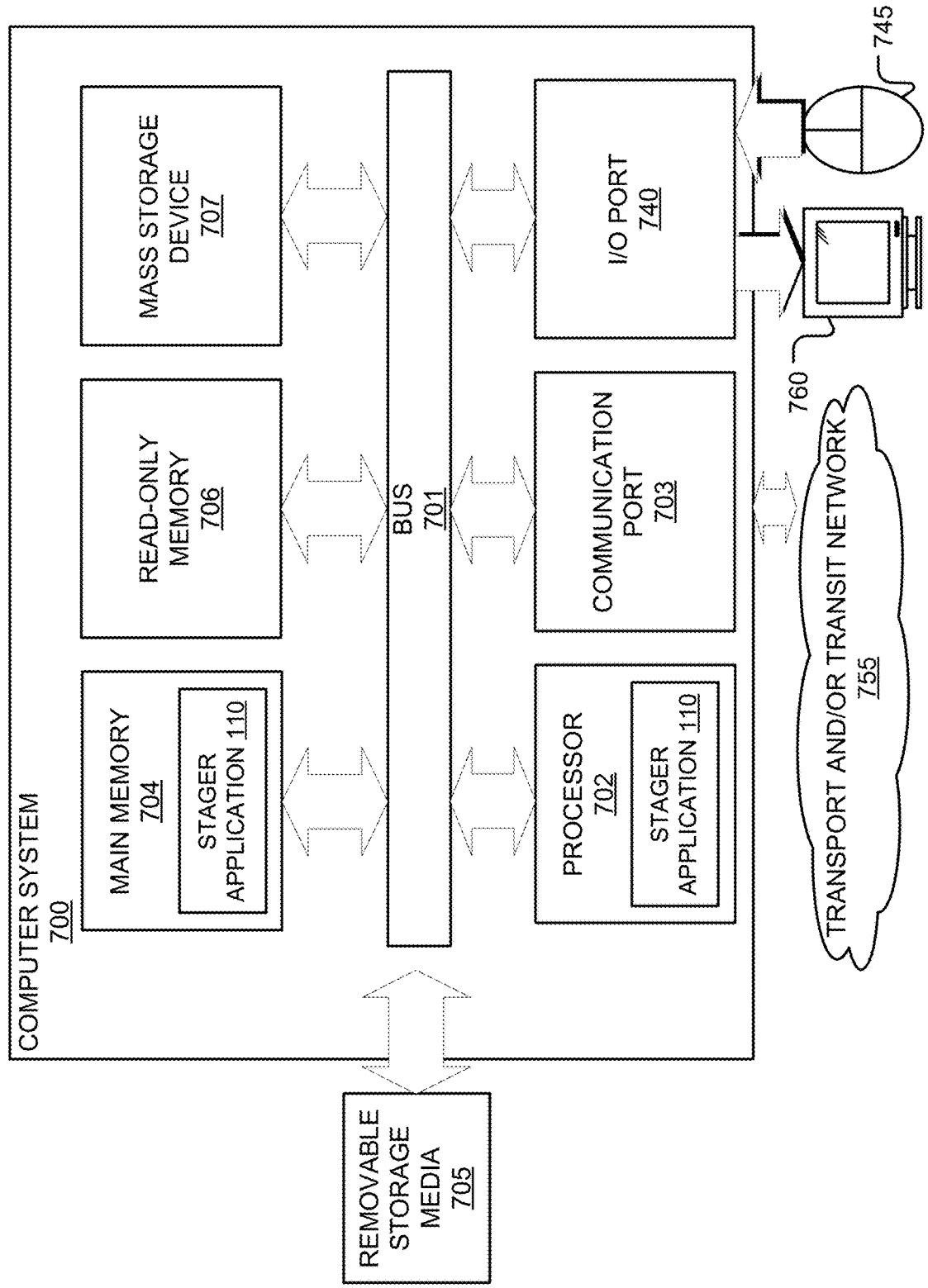

SYSTEMS AND METHODS FOR STAGING CUSTOMER PREMISE EQUIPMENT OF A TELECOMMUNICATIONS NETWORK

CROSS-REFERENCE TO RELATED APPLICATION

This patent application is related to and claims priority under 35 U.S.C. § 119(e) to U.S. Provisional Patent Application No. 62/340,860, entitled "SYSTEMS AND METHODS FOR STAGING CUSTOMER PREMISE EQUIPMENT IN A TELECOMMUNICATIONS NETWORK," filed May 24, 2016; and U.S. Provisional Patent Application No. 62/361,363, entitled "SYSTEMS AND METHODS FOR STAGING CUSTOMER PREMISE EQUIPMENT OF A TELECOMMUNICATIONS NETWORK," filed Jul. 12, 2016, all of which are fully incorporated by reference herein for all purposes.

TECHNICAL FIELD

Aspects of the present disclosure relate to order fulfillment and device deployment in the field of telecommunications; and more particularly, to an order fulfillment and staging platform operable to validate and configure customer premise equipment (CPE) or other network devices for providing a telecommunication, network or other service.

BACKGROUND

A service provider in the telecommunications industry faces countless challenges to provide any of the myriad of possible services related to telecommunications, network access, and the like. The service provider retrieves and processes numerous orders, configures various devices for the customers, and may need to determine shipping logistics for devices being shipped to customers. Customer premise equipment (CPE) refers to a collection of possible devices that are usually located at a customer location and are used to provide some telecommunication or like service to the customer. Hence, one or more CPE devices may be provisioned and installed at a customer location to fulfill an order.

Service providers may utilize conventional order entry systems or workflow systems to manage orders involving CPE network devices and prepare the devices for transport to customers. However, conventional systems fail to address various obstacles with respect to preparation of CPE network devices for customers. For example, conventional systems may require hardware/software updates for the CPE devices to be handled by third party vendors. Conventional systems may also require human intervention to manage configurations and monitor the many sub tasks that may be required to prepare the CPE network devices before being shipped to a customer location or otherwise being installed at the customer location. As a result, conventional systems may require an inordinate amount of human involvement with different subsystems in order to fulfill an order and configure any devices.

It is with these observations in mind, among others, that various aspects of the present disclosure were conceived and developed.

SUMMARY

A need exists for an improved staging platform to prepare CPE devices in the course of extending telecommunications services to customers. Accordingly, one implementation of the present disclosure may take the form of a method of staging devices, comprising: utilizing a computing device comprising a memory for storing a set of instructions that are executed by a processor to perform a set of operations comprising: receiving a device configuration request, the device configuration request associated with an order parameter; searching an inventory for a device associated with the device configuration request; selecting a staging location, the device being available at the staging location and the staging location satisfying the order parameter; verifying that the device at the staging location comprises predetermined hardware and software specifications; and issuing a configuration command to the device at the staging location as defined by the device configuration request.

Another implementation of the present disclosure may take the form of a system for staging devices, comprising a computing device that verifies software and hardware of a network device and issues a configuration command to the network device defined by a device configuration request associated with an order for a telecommunications service. The system further comprises a staging location selected by the computing device with the network device disposed at the staging location.

Another implementation of the present disclosure may take the form of a tangible computer readable storage media storing computer executable instructions for performing a computer process on a computing system, the computer process comprising: receiving a device configuration request as part of an order for a telecommunications service; selecting a staging location for a device associated with the device configuration request; verifying whether the device comprises predetermined hardware and software specifications; and issuing a configuration command to the device.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

FIG. 5 depicts an exemplary computing system that may implement various services, systems, and methods discussed herein

DETAILED DESCRIPTION

Figure 1:
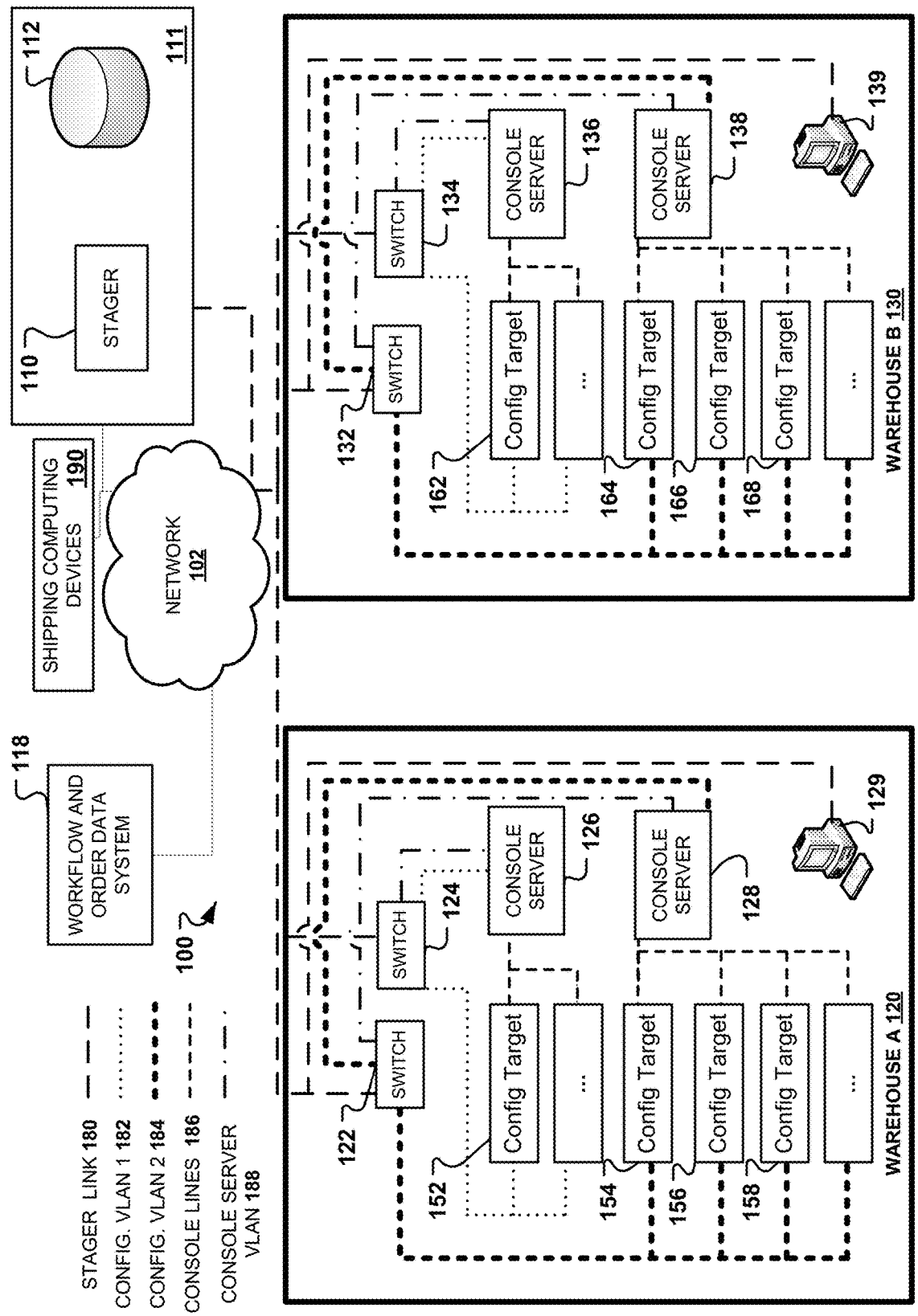
FIG. 1 illustrates an exemplary staging platform network topology, according to aspects of the present disclosure.

Aspects of the present disclosure comprise a telecommunications staging and order fulfillment platform (staging platform) operable to efficiently and intelligently stage CPE devices to fulfill an order from a customer for certain telecommunications services. The staging platform, in one example, may involve a rack system including various possible bays pre-arranged to receive (connect to and communicate with) various different types of CPE devices. The staging platform may further include a computing system, implementing one or more stager applications, that communicates with the CPE devices connected in the bays to perform various operations discussed herein. To stage CPE devices as part of fulfilling an order, the stager application may select or suggest certain physical staging locations (based on order specifications) that have access to or otherwise already contain a suitable CPE device (or devices) that are to be configured as designated by the order. Staging the CPE devices may further involve preparing the device to fulfil the order. For example, staging may involve validating the hardware and/or software of the CPE device, configuring the device by loading software on the device, and adjusting device settings, among other things. Generally speaking, the staging platform prepares the CPE devices to fulfill the order. The staging platform may further assist to monitor the order and facilitate shipment of the CPE devices to the customer.

In one implementation, an order may be received from a customer to a telecommunications network operator that includes CPE devices to be configured and shipped to the customer to fulfill the order. The staging platform may select or suggest a physical staging location, such as a warehouse location with a supply of appropriate CPE, based on parameters of the order. Parameters may include the type of service (and hence the type of CPE needed), the location of the customer, and order fulfillment deadlines. The staging location may also be selected based upon known CPE inventory at any given location.

Once the staging platform identifies a staging location, the stager may validate the CPE devices of the order which may include confirming availability of the device at the staging location. In some cases, availability may be determined by querying a bay designated for the correct type of CPE at the staging location and confirming whether a CPE is connected or otherwise available. In some instances, the system may wait for a device to be connected or available and in other instances may check for prepositioned devices. The staging platform may further assist to configure the CPE devices for the network/s of the service provider (and the customer) by, for example, modifying software settings of the CPE devices, installing software components to the devices, building communication links between the CPE devices and network elements of a telecommunications network of the service provider, and the like.

In one embodiment, a specific one of the bays of the rack (sometimes referred to as "shelves" or "locations" within the rack) containing CPE devices that are to be configured for a customer may be selected based upon an order of the bays in a queue system. For example, at the staging location, a bay (of the bays containing the desired CPE devices) that has just been used to provision other like CPE devices may be placed at the end of a queue. The positions of the other bays in the queue may be reordered such that other bays are moved towards the front of the queue and a bay that is the last most recently used bay may be positioned towards the front of the queue. Using the queue system, the bay in the rack that has undergone the longest time since it was last used or commissioned (referred to herein as the "last most recently used bay") may preferably be selected and the CPE devices within the selected bay may be configured and validated as per order parameters. Using the last most recently used bay (or a bay that has not been recently used) reduces the likelihood of selecting a bay containing a CPE device that has already been configured for another customer. For example, in some cases, devices may not yet have been removed from bays following configurations.

The stager application may further interact with a workflow and/or order data system of (or accessible to) the telecommunications network which may submit the order and order parameters to the stager application and request particular CPE devices be staged according to the order parameters. The stager application may communicate information and updates to the workflow and order data system as needed about stages of CPE device validation and configurations, CPE device availability, any possible errors or issues that may arise during staging or staging location selection, and the like. Certain errors may be reported to an operator or network operations center where the errors cannot be automatically corrected or addressed by predetermined responses built into the finite-state machine of the stager application. The stager application may periodically update the workflow and order data system and may issue a final confirmation when the CPE devices associated with the order are fully staged (configured and accessible to the service provider and customer) such that telecommunications services (requested by the order) can be successfully provided to the customer.

The stager application may further interact with computing devices of a shipping system (which may be external to the telecommunications network but accessible by the stager application) to generate shipping data for an order. The shipping data for the order may be used to select the staging location. Specifically, for an order, the stager application may poll inventory from databases associated with each of a plurality of warehouses, or access inventory of the warehouses from a centralized database, to determine which of the warehouses, if any, have inventory to provide and configure certain CPE devices based on parameters of the order. For example, the order may request a virtual private network (VPN), which may require the service provider to stage a CPE network device (such as a switch) to provision or otherwise make the VPN accessible to the customer. A warehouse that has inventory of the CPE network device for provisioning the requested VPN may be considered a possible staging location for such a telecommunications order.

The stager application may issue a request, from the computing devices of the shipping system, for shipping information for each possible staging location (that has inventory of the CPE network device). The request may include or otherwise be associated with information about certain order parameters. Specifically, the request may query the computing devices of the shipping system, for each possible staging application, and retrieve shipping information (for each possible staging location) comprising: whether the CPE network device may be delivered on or before a certain delivery date from a certain possible staging location, what the cost would be to ship the CPE network device from a certain possible staging location, what shipping methods are available at a possible staging application (e.g. standard or expedited), and the like. Based on the shipping information returned to the stager application for each possible staging location and the order parameters, the stager application may suggest or select a staging location (warehouse) for staging the CPE network device. Further, the stager application may comprise predefined logic and rules for selecting the staging location based upon the shipping information received for each possible staging location. For example, in one embodiment, the stager application may be pre-programmed to select a staging location where the CPE device can be shipped to the customer in the shortest amount of time. In another example, the stager application may select a staging location where the CPE network device can be shipped to the customer at the lowest cost. The selection is not limited to cost or minimal shipment time, and other rules or combination of rules are contemplated.

Referring to FIG. 1, a system 100 is shown comprising a network topology with various exemplary components of a telecommunications order fulfillment and staging platform. System 100 comprises a network 102, a stager application 110, a stager database 112, a workflow and order entry and data systems module 118, and warehouses of a service provider (either of which may comprise possible staging locations) designated as warehouse A 120 and warehouse B 130. The system 100 is not limited to two warehouses as shown and additional embodiments are contemplated comprising three or more warehouses. Network 102 may comprise a telecommunication and data network operated by a service provider. It should be understood that a service provider may operate a single telecommunications network or a plurality of networks and sub-networks to extend various telecommunications services to customers (VPN, VLAN, etc.). The stager application 110 may be implemented using a processor of a computing system or computing device 111. The stager database 112 may be communicably coupled or connected to the computing device 111 and may be implemented within the computing device 111 or be external to the computing device 111.

The service provider may operate the warehouse A 120 and warehouse B 130 as possible staging locations for CPE devices. Each of the warehouses may be located in different geographical locations. For example, the warehouse A 120 may be located in Phoenix, Ariz., and the warehouse B 130 may be located in Denver, Colo. At a given warehouse of the service provider, each of a plurality of CPE devices may be prepackaged, configured, and prepared for shipment to customers. In other words, the warehouses shown comprise possible staging locations for CPE devices that are to be packaged, configured, and otherwise prepared before being shipped or otherwise made available to customer locations. FIG. 1 shows a plurality of configuration targets, each labeled "Config Target." Each of the configuration targets may be associated with one or more CPE devices. As shown, warehouse A 120 stages configuration targets (CPE devices) 152-158, and warehouse B 130 stages configuration targets (CPE devices) 162-168. As further shown, each individual warehouse comprises components that may be utilized to prepare the CPE devices for customers. For example, warehouse A 120 may include various network elements such as a switch 124 and a switch 122, a console server 126, a console server 128, and a status terminal 129 which assist with the configuration and preparation of the configuration targets 152-158. Warehouse B 130 may include various network elements such as a switch 134 and a switch 132, a console server 136, a console server 138, and a status terminal 139 which assist with the configuration and preparation of the configuration targets 162-168. The CPE devices of each warehouse, such as configuration targets 152-158, may comprise switches, routers, firewalls, and other such forms of CPE devices. The CPE devices may also be manufactured or otherwise associated with various vendors including Cisco®, Netgear®, or the like.

The stager application may utilize the above described network elements to validate and configure CPE devices (or configuration targets). For example, in FIG. 1, the stager application may utilize the console server 126 and switch 124 to interact with and configure the configuration target 152. In order to communicate with network elements of each warehouse, a stager communication link, or stager link 180 (such as a virtual communication channel or virtual circuit) may be established between one or more switches of a warehouse and the stager application 110. As shown, the stager link 180 couples the stager application 110 to the switch 122 and the switch 124 of warehouse A 120, and the stager link 180 further couples the stager application 110 with the switch 132 and the switch 134 of warehouse B 130.

A console server virtual local area network (console server VLAN), or a plurality of console server VLANs, may be established between switches and console servers of each warehouse. A configuration virtual local area network (configuration VLAN), or a plurality of configuration VLANs, may be established between the console servers, the switches, and certain CPE devices (or configuration targets) of each warehouse. A plurality of console communication lines (which may include physical cable such as Ethernet category (CAT) 5 or virtual connections) may link or couple console servers and the CPE devices at each warehouse. As a specific example, as shown in FIG. 1, a configuration VLAN 1 182, abbreviated in FIG. 1 as "CONFIG. VLAN 1," may be established between the switch 124 and the console server 126. The configuration VLAN 1 182 may further couple the switch 124 to one or more configuration targets such as configuration target 152. A configuration VLAN 2 184, abbreviated in FIG. 1 as "CONFIG. VLAN 2," may be established between the switch 122 and the console server 128. The configuration VLAN 2 184 may further couple the switch 122 to the configuration target 154, the configuration target 156, and the configuration target 158. A plurality of console communication lines 186, abbreviated in FIG. 1 as "CONSOLE LINES," may couple the console server 126 to the configuration target 152, and the plurality of console communication lines 186 may also couple the configuration target 154, the configuration target 156, and the configuration target 158 with the console server 128. In one embodiment, each of the communication console lines 186 comprise physical connections (such as CAT 5 connections) from the console servers to bays of a rack (housing individual configuration targets such as CPE devices). Further, as shown, one or more console server VLANs, such as a console server VLAN 188, may couple the switch 122 to the console server 128, and also couple the switch 124 to the console server 126.

The stager communication link 180, the plurality of console communication lines 186, the console server VLAN 188, and the configuration VLANs (182 and 184) may be utilized (and in some embodiments generated at least in part) by the stager application 110 to communicate with or otherwise access CPE devices (directly or through a console server/switch pair) in order to validate and configure the configuration targets (CPE devices) according to the order parameters. In other words, as devices are loaded into a bay of a rack at the warehouse 120, the devices may be integrated within the system 100 of FIG. 1 and made available or accessible to the stager application 110 due to the specific network topology of the stager communication link 180, the plurality of console communication lines 186, the console server VLAN 188, and the configuration VLANs (182 and 184). The stager application 110 may execute a command to the console server 126, through the stager communication link 180 and switch 124, to determine whether a particular CPE device, such as configuration target 152, is loaded in a particular designated bay of a rack at the warehouse A 120. Upon receiving such a command, the console server 126 may retrieve or otherwise access information about the particular designated bay of a rack at the staging location (using, for example, the switches, console servers, and above described communication lines).

The console servers, such as the console server 126, may build or execute the configuration VLANs such as configuration VLAN 1 182. A VLAN, generally, may encompass a virtual embodiment of a LAN and may comprise a subset of ports on a single switch or a subset of ports on multiple switches. Network traffic associated with one VLAN may be independent or not visible to other VLANs on the same network. VLANS may allow a system administrator to partition networks and meet security and functional requirements without having to build physical connections or make substantial network infrastructure changes.

In one embodiment, console servers, such as console server 126, may run dynamic host configuration protocol (DHCP) for building or establishing a configuration VLAN between configuration targets and one or more computing devices executing the stager application 110 in order to stage the configuration targets. More specifically, VLANs may be used to send configuration and validation instructions from the stager application 110 to the configuration targets and/or for the configuration targets to send information back to the stager application 110 in order to stage the configuration targets. The console servers of the warehouses of FIG. 1 may be paired with the illustrated switches to configure configuration targets such as configuration targets 152-154. For example, console server 126 may be paired with switch 124 to configure/access configuration target 152. Such console/switch pairs may in certain embodiments support up to 48 configuration targets. Additional configurations/arrangements of switches and console servers used to configure, validate, and stage the configuration targets are contemplated. Status terminals, such as status terminal 129 of the warehouse A 120 may be utilized so that local administrators of the warehouse A 120 can monitor and view configurations, and view status messages. Specifically, the stager application 110 may generate error or status messages, and submit such messages to the status terminal 129. Such messages may be particularly important where the message is a request by the stager application 110 to handle physical tasks such as loading additional CPE devices, fixing or correct the physical placement of CPE devices in bays and racks of the warehouse, physically installing additional hardware as needed such as a network card, and the like.

FIG. 1 further shows the stager application 110 and a stager database 112 which may be stored on one or more computing devices including at least one of a server, mainframe, desktop computer, terminal, laptop, tablet, or the like and may include at least one storage device. The stager database 112 may store data about orders received from the workflow and order data system 118 including order parameters. The stager database 112 may contain current standard version numbers for operating systems of CPE devices and any required patch files for each model of target hardware (against which software validation may be performed). The stager database 112 may further contain a table listing each CPE/CPE type, CPE peripherals for each CPE/CPE type, and packaging weights for each CPE/CPE type (the comprehensive weights for different devices may be used by the stager application 110 to accurately query and procure shipping services). The stager database 112 may further store, centralize, or have access to data about inventory of CPE devices at each of a plurality of warehouses so that the stager application 110 can determine whether particular warehouses may be used as possible staging locations (the warehouses have inventory of certain CPE devices as needed to fulfill a particular order). In some embodiments, the stager application 110 and the stager database 112 may be executed using virtual machines. Virtual machines are generally understood as self-contained or isolated operating environments that behave as if they exist in a separate physical device and are created using one or more virtual machine development applications. In other words, each virtual machine can function as if it can access an entire device where the virtual machine is installed or being accessed. Virtual machines may communicate with the hardware of a device via a virtual machine monitor (VMM) control program. The VMM "virtualizes" the hardware for each virtual machine. Virtual machines enable different operating systems (with sometimes different applications) to run in the same computer at the same time without interfering with one another. In some cases, a virtual machine can be defined as a set of parameters that define its behavior. These parameters include hardware settings (such as how much memory the virtual machine should have, what hard disks should be virtualized through which container files, what CDs are mounted etc.) as well as state information (whether the virtual machine is currently running, saved, its snapshots etc.). Once installed, a virtual machine and its virtual hard disks can be considered a "container" that can be arbitrarily frozen, woken up, copied, backed up, and transported between hosts. In addition, with some virtual machine applications, "snapshots" can save a particular state of a virtual machine and revert back to that state, if necessary. With a virtual machine, the operating system of the physical computer on which the virtual machine is installed is generally referred to as a host operating system. The operating systems that are running inside virtual machines are generally referred to as guest operating systems. The stager application 110 may be implemented as part of or using a virtual machine. For example, a virtual machine may allow the stager application 110 to analyze possible device configurations at one or more warehouses before actually setting up network connections to network elements at such locations. The stager database 112 may be coupled to back-up storage devices to maintain data regarding device configurations by the stager application 110.

As further shown, the stager application 110 may communicate with a workflow and order data system 118 using the network 102 (or a plurality of telecommunication networks). The workflow and order data system 118 may retrieve orders and order parameters from customers and issue CPE device configuration requests to the stager application 110 based on the order parameters. The CPE device configurations may be utilized to provision telecommunications services to the customers. The stager application 110 may periodically update the workflow and order data system 118 regarding the status of CPE device configurations requested by the workflow and order data system 118. For example, the stager application 110 may alert the workflow and order data system 118 where an issue occurs during device configuration, or the stager application 118 may request additional information from the workflow and order data system 118 as needed. The type of issue that is reported may be one which cannot be automatically addressed or resolved using pre-determined procedures built into a finite-state machine. The workflow and order data system 118 may make certain order parameters available to the stager application 110 so that the stager application 110 can suggest or select an optimal staging location for CPE devices that needed to be configured. Order parameters may include a customer-requested delivery data for such CPE devices, a location of the customer, a maximum cost, CPE device specifications, and the like.

As shown, the stager application 110 may further interact with computing devices of a shipping system, labeled as shipping computing devices 190 (which may be external to the network 102 but accessible by the stager application 110) to generate shipping data for an order. The shipping data for the order may be used to select a staging location, or a particular warehouse that best meets predefined specifications, rules, or preferences for an individual order. In one specific example, information about an order X, received from a customer, may be sent to the stager application 110 from the workflow and order data system 118, with a request for a device configuration. In particular, the order X may involve a customer desiring a VPN which may require that a particular type of CPE device be specially configured to provision the VPN service to the customer based on the order parameters, and the specifications of the computing environment and/or networks of the customer. As an initial step, the stager application 110 may poll inventory from databases associated with each of a plurality of warehouses, or access inventory of the warehouses from a centralized database such as the stager database 112, to determine which of the warehouses, if any, have inventory to provide and configure certain CPE devices based on parameters of the order (have inventory of the particular type of CPE device needed). The plurality of warehouses may include the warehouse A 120, the warehouse B 130, and the warehouse C 220 of FIG. 2 (in addition to other warehouses). A warehouse that has inventory of the particular type of CPE device may be a possible staging location. For example, where the warehouse A 120 and the warehouse B 130 of FIG. 1, and the warehouse C 220 of FIG. 2 all have available inventory of the particular type of CPE device needed for the order X, each of the aforementioned warehouses may be considered possible staging locations.

The stager application may issue a request, from the shipping computing devices 190, for shipping information for each possible staging location (that has inventory of the CPE network device). The request may include or otherwise be associated with information about certain order parameters of the order X. Specifically, the request may query the shipping computing devices 190, and retrieve shipping information for each possible staging location that takes into account the geographical location of each possible staging location. The shipping information returned from the shipping computing devices 190 for each possible staging location may include: whether a CPE network device (of the particular CPE device type) may be delivered on or before a certain delivery date from a warehouse, what the cost would be to ship the CPE network device from a warehouse based on a geographical location of the warehouse, what shipping methods are available at a possible staging application/warehouse (e.g. standard, or expedited), and the like. In other words, certain possible staging locations, or warehouses, may return different information depending upon the geographical location of the possible staging location, and available shipping methods in that area.

Based on the shipping information returned to the stager application 100 from the shipping computing devices 190, for each possible staging location, the stager application may suggest or select a staging location (warehouse) for staging a CPE network device associated with the order X. The stager application may comprise predefined logic and rules for selecting the staging location based upon the shipping information received for each possible staging location. For example, in one embodiment, the stager application may select a staging location where the CPE network device (of the particular CPE device type) can be shipped to the customer in the shortest amount of time. The location of the customer, where the CPE network device is to be shipped may be closer to one warehouse as compared to another. In another example, the stager application may select a staging location where the CPE network device can be shipped to the customer at the lowest cost. For example, a certain warehouse may be farther away from a customer location than other warehouses, but because the certain warehouse has access to expedited shipping methods, and other warehouses do not, the warehouse that is farther away may in some cases be a suitable selection. The selection of a possible staging location is not limited to cost or minimal shipment time, and other rules or combination of rules are contemplated. In one specific embodiment, the stager application may access the shipping computing devices 190 using one or more web interfaces such as an application programming interface (API). The shipping computing devices 190 may be associated with entities such as UPS, FedEx, and the like. In one specific embodiment, the stager application may access the computing devices of the shipping system using one or more web interfaces such as an application programming interface (API).

Figure 2:
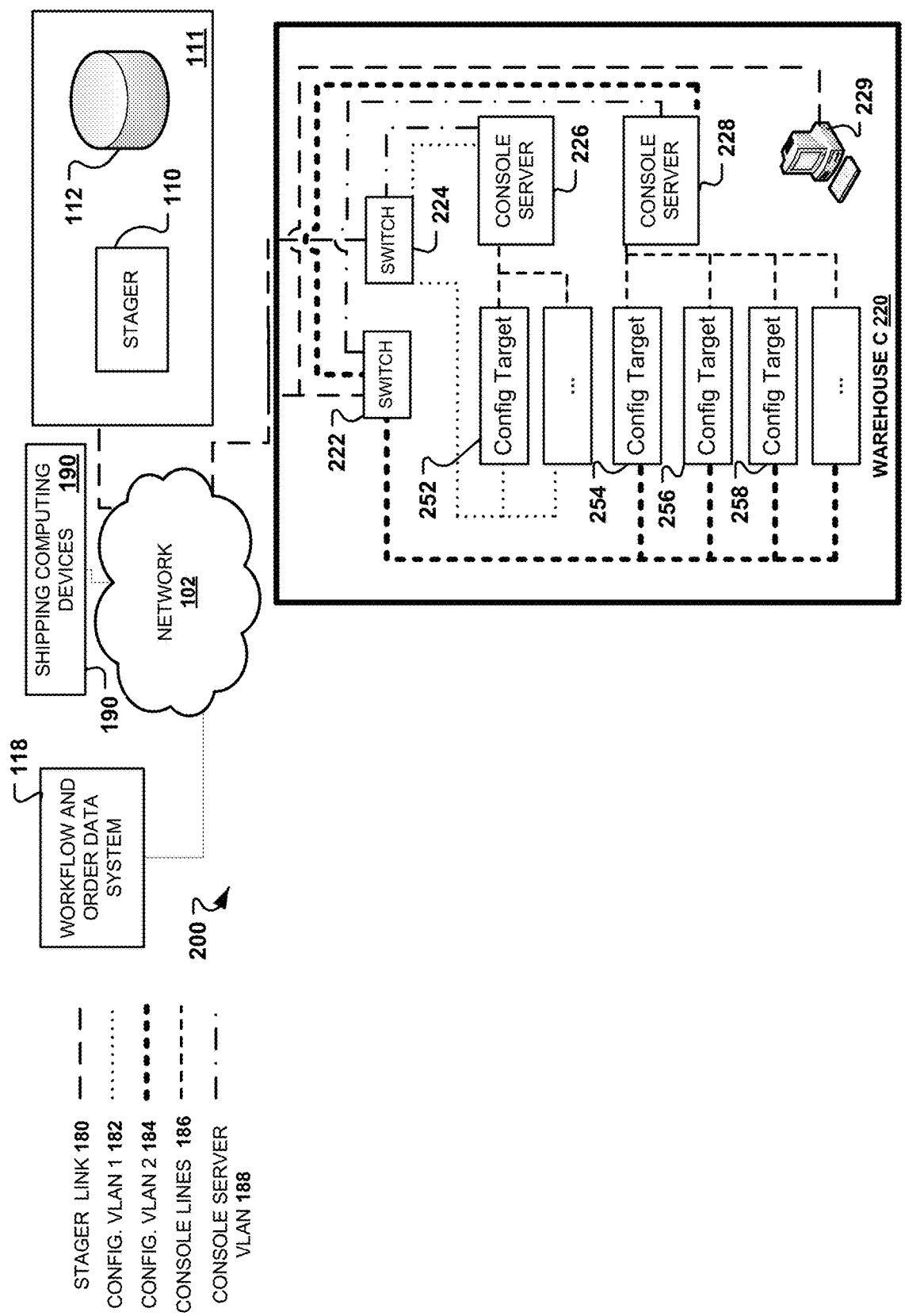
FIG. 2 illustrates another exemplary staging platform network topology, according to aspects of the present disclosure.

FIG. 2 shows a system 200 similar to the system 100 of FIG. 1 where the stager application 110 has selected a warehouse (from a plurality of warehouses) to configure one or more CPE devices in the course of provisioning telecommunications services to customers. System 200 may illustrate an example where a single staging location has been selected at a warehouse C 220. As shown, the stager application 110 may be in communication with a switch 224, a switch 2 222, a console server 226, a console server 228, and a status terminal 229 in order to stage and configure one or more configuration targets (CPE devices) 252-258. Utilizing console/switch pairs, and configuration VLANs, the stager application 110 may communicate with and execute commands to the configuration targets (CPE devices) 252-258. The stager application 110 may validate whether, for example, the configuration devices 252-258 are housed in the correct bays. The stager application 110 may load the configuration targets 252-258 with predetermined software configurations including modifications to firmware, operating systems, adjustments to settings of the configuration targets 252-258, and installing one or more software packages so that the configuration targets 252-258 can be integrated within a telecommunications network, and, to enable the configuration targets 252-258 to be successfully utilized in the course of provisioning telecommunications services to a customer.

Figure 3:
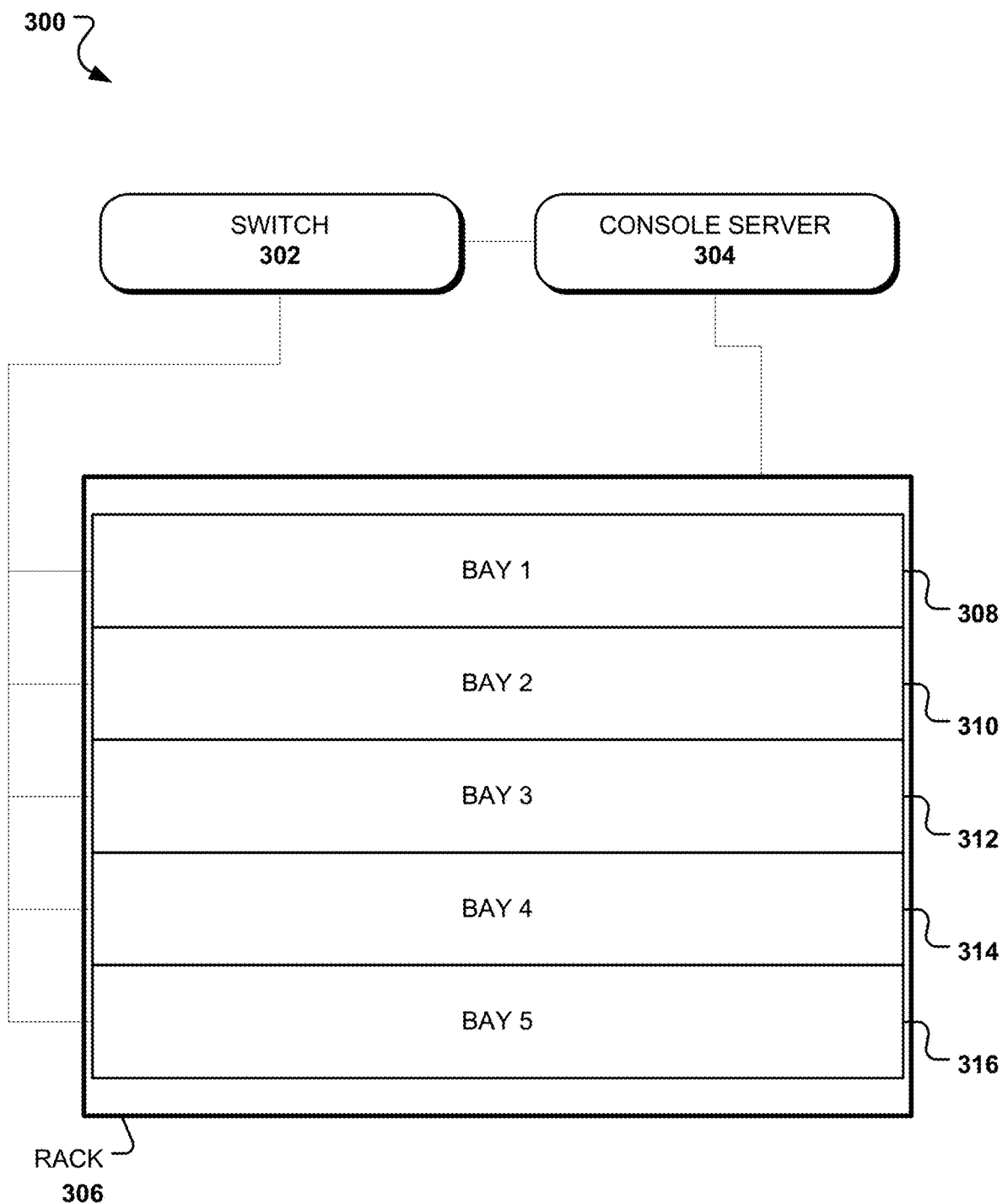
FIG. 3 illustrates racks and bays and illustrates a queue system for selecting certain bays to stage the CPE devices, according to aspects of the present disclosure.

FIG. 3 depicts exemplary hardware 300 of a staging warehouse including a plurality of racks and bays which may be in operation within the warehouse, such as warehouse C 220, and contain or be connected to CPE devices before the CPE devices are delivered or otherwise provided to customers. FIG. 3 shows a rack 306, a plurality of bays (308-316) as slots or shelves within the rack 306, a switch 302, and a console server 304. The plurality of bays (308-316) may house or otherwise be associated with any one of the configuration targets of FIGS. 1 and 2. In other words, the configuration targets of FIGS. 1 and 2 may be CPE devices housed within the plurality of bays (308-316) shown in FIG. 3. The switch 302 and the console server 304 may be associated with any one of the switches or console servers of FIGS. 1 and 2. The warehouses disclosed are not limited to a single rack, or single switch-console server pair. As such, other embodiments contemplate multiple switches and console servers and multiple racks in a given warehouse.

A bay, such as bay 308, is a shelf or slot on a rack which may be designated for particular hardware (particular model of CPE device), may have a dedicated power lead, a dedicated Ethernet connection to a switch, and a console connection. An individual warehouse, such as warehouse C 220, may have any number of bays (e.g. up to 80 or more bays) containing or otherwise connected to various forms of CPE devices such that the CPE devices can be staged and configured for customers according to order parameters. The racks, such as rack 306, may be pre-configured with connectivity to networks of the service provider (by way of the console server 304 and switch 302) such that CPE devices may be installed/loaded within the bays and racks and may then be communicably coupled to the network 102 of the service provider, the stager application 110, and optionally other network elements of the service provider. A database, such as the stager database 112, may include a table defining predetermined bay locations for specific CPE devices. In other words, the table may define that certain ranges of bays (such as bays 314 and 316) in a hardware rack of a warehouse may be reserved for certain models/brands of particular routers. The stager application 110 may check and validate that certain bays contain or are otherwise connected to the correct CPE hardware as part of staging the CPE devices to fulfill orders. The stager application 110 may verify whether a particular model of a CPE device is loaded within a particular bay, request a status of the CPE device, determine whether the CPE device has been configured for another customer or whether the CPE device is available for a new customer, whether the CPE device needs a particular network card, and the like. The stager application 110 can validate and configure each CPE device consistent with specifications for an order and consistent with predefined rack specifications regarding the correct placement of various CPE devices within certain bays.

Figure 4:
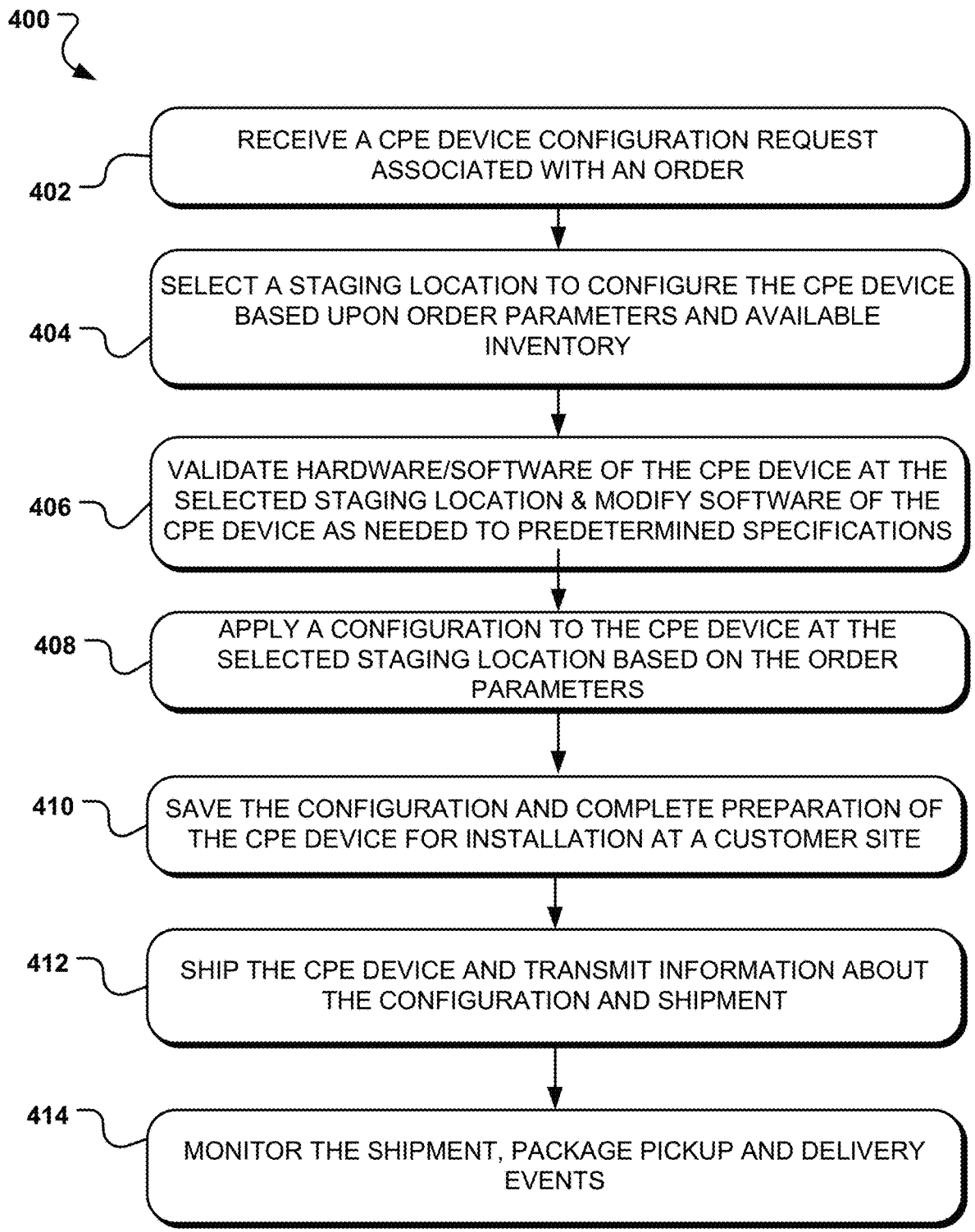
FIG. 4 is an exemplary process flow for staging CPE network devices using a stager application, according to aspects of the present disclosure.

Further explanation of the aforementioned components of FIGS. 1-3 may be illustrated by FIG. 4 which depicts one possible process flow for utilizing the stager application 110 with an environment such as system 100. In block 402 of FIG. 4, the stager application 110 may receive information about an order, or a device configuration request, from the workflow and order data system 118. An order received or processed by the workflow and order data system 118 may include a request for a CPE device configuration (and/or a plurality of CPE network devices) associated with the order. The order may comprise various order parameters including information about what type of CPE network device needs to be configured. For example, the order may be associated with a device configuration request for a type A CPE network device (which may be a particular model or version of a particular manufacturer). Other order parameters may include customer preferred shipping methods for the CPE network device, preferred configurations for the CPE network device, a customer ID, a customer location, and the like. The stager application 110 may use the order parameters to identify one or more possible staging locations for addressing the device configuration of the type A CPE network device.

Inventory availability of different warehouses or staging locations may further be used to select a staging location. Specifically, the stager application 110 may retrieve, or otherwise have access to information about inventory of CPE devices at one or more warehouses. Where a warehouse, such as warehouse A 120, has at least one available type A CPE network device, the warehouse may be considered a possible staging location.

Upon receiving the order parameters and determining possible staging locations, the stager application 110 can communicate with the shipping computing devices 190, associated with systems such as UPS®, to retrieve shipping information. The stager application 110, may request shipping costs from one or more shipping systems, request time for delivery, request/determine possible shipping methods, and retrieve other information for each of the possible staging applications in order to determine an optimal staging location of the service provider from which to conduct a device configuration for the type A CPE network device (and optionally ship the device to the customer). In other words, by communicating with computing devices of various shipping systems, and taking into account different locations of warehouses of the service provider, the stager application 110 can retrieve shipping data which can be used to determine or select a staging location. For example, such shipping information may include how much shipping would cost from different warehouses. In some embodiments, shipping computing devices 190 may send back a list or multiple lists of information based upon the request by stager application 110 including information about shipping costs from one or more of the respective warehouses, available shipping options, and whether shipping is in fact available at one or more of the possible staging locations. The shipping information assists the stager application 110 with selecting a particular staging location (warehouse) such as the warehouse C 220 of FIG. 2. In addition, logic such as one or more pre-defined rules or decision trees, or machine learning, may be utilized by the stager application 110 to tune the stager application 110 to select certain warehouses for staging locations under certain conditions. For example, the stager application 110 may be implemented with logic that directs the stager application 110 to select a warehouse as a staging location where the warehouse has inventory of the type A CPE network device available, shipment of the type A CPE network device may occur before a preferred delivery date as defined in the order parameters, and the warehouse is the lowest cost option.

As shown in block 404, using warehouse information, order parameters, and shipping information for each possible staging location, a staging location may be selected. Continuing the previous example, the warehouse C 220 may be selected as a staging location for the type A CPE network device which the order of the present example has requested to be configured (as defined within order parameters). It may be determined that the warehouse C 220 has sufficient inventory of the type A CPE network devices and providing the type A CPE network device from the warehouse C 220 satisfies delivery criteria imposed by the customer in the order parameters. In other words, after querying the shipping computing devices 190, it may be determined that the warehouse C 220 provides the best shipping option, or at least meets a predefined shipping threshold (e.g. the warehouse C 220 has access to expedited shipping, or the warehouse C 220 is closest to the customer). The warehouse C 220 may further be selected using predefined logic that instructs the stager application 110 to select certain warehouses that best meet certain pre-defined conditions, as described above.

Where the warehouse C 220 is selected as a staging location, at least one of the configuration targets 252-254 shown in FIG. 2 may be associated with a type A CPE network device, and may be selected for the device configuration of the type A CPE network device as defined by the order parameters. The configuration targets 252-254 may have been pre-loaded into bays of the warehouse D 220 and in some embodiments may be loaded into bays straight out of the box with factory/manufacturer configurations. In some embodiments, certain bays of the warehouse C 220 (such as bays housing the configuration targets 252-254) may be designated for type A CPE network devices, such that such devices should typically be housed within certain bays. In some embodiments, when such type A CPE network devices have been removed from their designated bays and configured and shipped for other customers, the bays may be re-populated with the type A CPE network devices assigned or designated for such bays. The bays may be coupled to e.g. the console server 226 and switch 222 such that once CPE devices are loaded into the bays; the CPE devices may readily communicate with or otherwise be accessible to the stager application 110. As such, continuing the present example, the stager application 110 may access a type A CPE network device as one of the configuration targets 252-254 at the warehouse C 220 and configure that specific configuration target for the customer according to the order parameters.

In some embodiments, a configuration target is selected from bays of a warehouse (to conduct a device configuration according to order parameters) using a queue system; such as a last recently used queue system defined below. In particular, using a queue system, each of the bays of the warehouse C 220 may be associated with certain positions in a queue. The stager application 110 may determine which bay/bays have been most recently used at warehouse D 220 and push those last used bays to a position farther down the queue so that other bays can be utilized to for the requested device configuration of the type A CPE network device. A specific example may be illustrated with reference back to FIG. 3. After selecting the warehouse C 220 having at least one of the type A CPE network devices available, the stager application 110 may select a rack 306 of the warehouse C 220 and determine or otherwise identify that bays 1-5 (308-316) of the rack 306 (coupled to a switch 302 and console server 304 similar to FIGS. 1 and 2 with respect to form and function) are designated for, contain, or are otherwise connected to type A CPE network devices (as needed to fulfill the order). The stager application 110 may be operable to determine that bays 1-4 were recently used to fulfill other similar orders for type A CPE network devices and that bay 5 316 is the last recently used bay to configure devices of the type A CPE network devices. Thus, the stager application 110 may choose bay 5 316 (as the next bay in the queue) and may select and configure a configuration target specifically from bay 5 316 to satisfy the order parameters. The stager application 110 may execute software calls to or otherwise have access to information about the bays 1-5 (308-316) to organize the bays within queues and determine whether certain predetermined CPE devices (the correct CPE device type and model) are properly loaded in the bays designated for those particular CPE devices.

Returning to FIG. 4, in block 406, the stager application 110 validates hardware and software of the CPE device/s at the staging location. Continuing the example, the stager application 110 may validate hardware and software of a type A CPE network device, or one of the configuration targets 252-254, such as configuration target 252. Specifically, the stager application 110 may issue a command to a bay of warehouse D 220 to make sure that the configuration target 252 is available and disposed in a proper designated bay location, and/or that the configuration target 252 is loaded with certain software such as predetermined firmware, a certain predetermined operating system, or a predetermined version of the operating system. The stager application 110 may further verify that the configuration target 252 is a correct hardware type, model, and version. At this step, modifications to the software of the configuration target may be made to modify the firmware or the operating system. Modifications may include updating/rolling back software of the CPE devices to older versions or more recent versions in order to modify the software to preferred specifications. The preferred specifications may be predetermined by the service provider and may be optimal and/or best compatible for integrating the CPE devices within the networks of the service provider. In addition, at this step, the stager application 110 verifies that a selected configuration target has not already been configured for another customer.

In block 408, the stager application 110 configures the CPE network devices. Specifically, the stager application 110 may take a configuration list (which may be provided by the order parameters), interactively loads a configuration onto a type A CPE network device by issuing certain commands to the type A CPE network device, and makes sure the devices accept each configuration command while detecting and alerting the system 100 if anything goes wrong or fails with each command. Configurations may be loaded to CPE devices one at a time. Commands may be inputted to the CPE devices as a series of automated commands using a plurality of pre-defined software programs and logic trees. In one embodiment, commands may be inputted using a string processing based finite-state machine. A finite-state machine may be referred to as finite-state automation or as a state machine and may comprise a mathematical model of a computation used to design sequential logic circuits and/or computer programs. It may be a machine that is in one of a finite set of states and may be in one state at a time; changing states based upon one or more triggering events or conditions (transitions). A finite-state machine may be defined by a list of its states, and the triggering condition for each state. In one embodiment, the stager application 110 may employ a finite-state machine to configure the hardware and/or software of a CPE device. Specifically, one state of the finite-state machine may involve a line of commands to execute a first portion of a predetermined configuration to the CPE device. The finite-state machine may transition to a second state (involving another line of commands) where the line of commands results in successfully configuring the CPE device with the first portion of the predetermined configuration. In other words, a triggering event (to move from the first state to the second state) may comprise where the line of commands successfully configure the CPE device with the first portion of the predetermined configuration. The line of commands may include any and all instructions, commands, or installations to the CPE device such as installing a software module to the CPE device to allow the CPE device to be accessible by a network and administration devices of the service provider. Commands may be unique to certain types of CPE devices such that different decision trees or logic may be used for different types of CPE devices. The above commands may be inputted by the stager application 110 automatically as if the stager application 110 were a human operator inputting configuration commands to a CPE device, one by one. Yet, by using pre-defined logic and commands for different CPE devices (conducting device configurations by a finite-state machine), device configurations can be automated and human intervention and human error involving device configurations can be reduced.

In the event of an error, the stager application 110 may call or alert a human operator for assistance. One possible type of error might be where the type A CPE network device has not been loaded with a proper network card in which case the stager application 110 may detect or otherwise have access to information regarding the absence of the card and alerts a human operator (to physically load the card). During configuration, status updates may be returned to the workflow and order data system 118. Status updates may be transmitted after a successful device configuration or after a set of commands has been successful executed to a CPE device as part of device configuration.

In block 410 of FIG. 4, where the configuration of the CPE network devices completes successfully, the stager application 110 saves the configuration on each CPE device. For example, a configuration may be saved to the type A CPE network device. A status message may be returned to the workflow and order data system 118 to indicate that e.g. in bay 5 of the warehouse C 220, configuration target (CPE device) 252 is ready to be packed and shipped. A software call/instruction may be executed from stager application 110 to systems of the warehouse to alert a human operator to prepare/package the CPE device in bay 5 for shipping. The stager application 110 may further contact one or more shipping systems to clarify shipping methods, obtain tracking information, weigh the CPE device/s, and obtain pickup schedules for shipments to the customer. Such information may be returned to the workflow and order data system 118. As shown in block 412, the CPE network devices may be shipped and systems may be updated regarding the shipment and the status of the shipment. In addition, as reflected in block 414, the shipments may be monitored, package pickup may be monitored, and delivery events may be monitored and reported back to the order data system 118. In some embodiments, the stager application 110 continues to track shipments, interacting with vendor API/s and internal workflow. The stager application 110 may alert human operators to errors reported by the shipping vendor through an API, or may generate missed delivery date messages. This reduces manual workload of having to follow-up regarding discovery of a successful delivery, identify lost shipments, identify bad delivery address info, and the like. In the Stager ecosystem the operator may receive notice in the form of a workflow task or the workflow advances automatically in the event of successful delivery (taking record of receiver signatory into the order record).

In sum, order parameters and device configuration request associated with certain order parameters are retrieved by the stager application 110 which may include a request for one or more CPE devices to be configured in order to provision telecommunications services. The order parameters may comprise specifications and/or desired settings for device configurations and preferred shipping parameters. Inventory of the service provider may be polled to locate available inventory (at warehouses) for the one or more CPE devices needed that need to be configured to fulfill the order. Requests for information may be made to computing systems of a shipping company to retrieve information about shipping costs and availability for shipping from warehouses having inventory of the one or more CPE devices. A staging location (warehouse) of the service provider may be selected where the selected staging location is determined to be optimal for fulfilling the order and best meets the order parameters and any requests/preferences of the customer. The stager application 110 may be pre-programmed to select staging locations based upon certain thresholds such as selecting a staging location where shipment of the CPE devices to the customer would be most cost-efficient or timely. Bays within the selected staging location may be identified that are designated for, contain, or have access to one or more desired CPE devices that can satisfy the order parameters. Further, a specific one of the bays containing the desired CPE devices may be selected based upon order of the bays in a queue system. For example, at the staging location, a bay (of the bays containing the desired CPE devices) that has just been used to provision other like CPE devices may be placed at the end of a queue. The positions of the other bays in the queue may be reordered such that e.g. other bays are moved towards the front of the queue and a bay that is the last most recently used bay may be positioned towards the front of the queue. Using the queue system, the last most recently used bay may preferably be selected and the CPE devices within the selected bay may be configured and validated as per order parameters. Using the last most recently used bay (or a bay that has not been recently used) reduces the likelihood of selecting a bay containing a CPE device that has already been configured for another customer. Further, validation of hardware and software for the CPE device/s may be conducted, the CPE devices may be configured, and the configurations may be saved. The CPE devices may be prepared for shipping, the order entry system may be updated, and the CPE devices may be shipped off or otherwise made available to the customer. Where the CPE devices are shipped, the stager application 110 may periodically poll for updated shipping information for the shipped devices and report the same to the workflow and order data system 118.

FIG. 5 is an example schematic diagram of a computing system 700 that may implement various methodologies discussed herein. For example, the computing system 700 may comprise a laptop, desktop, or server used to execute the stager application 110 operable to validate CPE devices, coordinate CPE configurations, and prepare CPE devices for shipment to customers. The computing system 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computing system 700 connects. Computing system may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 is encoded with a stager application 110 that supports functionality as discussed herein. For example, in one embodiment, the stager application 110 may include or otherwise implement the various processes and/or instructions for validating and configuring CPE equipment as described herein. At least a portion of stager application 110 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret, or otherwise perform processes, such as through logic instructions, executing on the processor 702 and based on the stager application 110 and associated software modules stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of staging devices, comprising:
utilizing a computing device comprising a memory and a processor, the memory storing a set of instructions that are executed by the processor to perform a set of operations comprising:
receiving a device configuration request, the device configuration request associated with an order parameter, the order parameter comprising a customer delivery location associated with delivery of a device;
searching an inventory of devices for the device associated with the device configuration request;
selecting, based at least on the order parameter, a physical staging location to which to send the device to be configured before delivery to the customer delivery location, the physical staging location satisfying the order parameter, wherein the device is sent to the physical staging location before delivery to the customer delivery location, and wherein the device is sent to the customer delivery location from the physical staging location;
verifying that the device at the physical staging location includes predetermined hardware and software components based at least on the order parameter;
issuing a configuration command to the device at the physical staging location as defined by the device configuration request; and
sending, to a system of the physical staging location, a status message indicating that the device has been configured and is to be delivered from the physical staging location to the customer delivery location.

2. The method of claim 1,
wherein the device configuration request is associated with an order for a telecommunications service, the order for the telecommunications service comprising the order parameter; and
wherein issuing of the configuration command to the device as defined by the device configuration request and installing the device in a customer network extends the telecommunication service to the customer network according to the order parameter.

3. The method of claim 1,
wherein the configuration command is defined by a communication protocol specifically used for communicating with the device and the configuration command is issued to the device using a finite-state machine to automate configuration; and
wherein verifying that the device includes the predetermined hardware and software components comprises determining that the device includes a predetermined type of network device and a predetermined version of an operating system and firmware.

4. The method of claim 1, wherein the order parameter is associated with a delivery time, further comprising:
searching the inventory of devices to determine whether the device is available at an additional physical staging location; and
accessing shipping information about the physical staging location and the additional physical staging location from at least one shipping computing device, the shipping information comprising information about an estimated cost and available shipping options to ship the device to the customer delivery location,
wherein selecting the physical staging location is further based at least on the delivery time and on the shipping information associated with the physical staging location exceeding an estimated cost and available shipping options predetermined threshold.

5. The method of claim 1, further comprising:
providing a console server-switch pair at the physical staging location in communication with a bay housing the device; and
transmitting a request to the console server-switch pair to confirm that the bay houses the device, the device comprising a specific type of customer premise equipment assigned for the bay.

6. The method of claim 5, further comprising:
establishing a configuration virtual local area network (VLAN) between the console server-switch pair and the device using a dynamic host configuration protocol (DHCP);
establishing a communication link between the computing device and the device;
transmitting an instruction from the computing device to the console server-switch pair to issue the configuration command; and
utilizing the console server-switch pair to issue the configuration command to the device as instructed by the computing device.

7. The method of claim 1, further comprising utilizing the computing device to load the device with a predetermined resource configuration to enable network elements of a telecommunications network to access the device.

8. The method of claim 1, wherein the order parameter further comprises a requested delivery date for the device.

9. The method of claim 1, further comprising staging the device using a predetermined bay of a plurality of bays of a rack at the physical staging location, the predetermined bay selected using a queue system with the predetermined bay being in a first position of the queue system.

10. The method of claim 1, further comprising modifying a firmware or an operating system of the device to a predetermined version that extends a telecommunications service to a customer network using the device.

11. The method of claim 1, further comprising selecting the physical staging location by utilizing a predetermined rule limiting the physical staging location to a warehouse that can ship the device in time to meet a customer requested delivery date.

12. The method of claim 1, further comprising transmitting the status message about the configuration command to a display device.

13. A system for staging devices, comprising:
a network device; and
a computing device in communication with the network device, the computing device executing the operations of:
receiving a network device configuration request associated with an order parameter, the order parameter comprising a customer delivery location associated with delivery of the network device;
searching an inventory of network devices for a device associated with the network device configuration request;
selecting, based at least on the order parameter, the network device from the inventory of network devices;
selecting, based at least on the order parameter, a physical staging location to which to send the network device to be configured before delivery to the customer delivery location, the physical staging location satisfying the order parameter, wherein the device is sent to the physical staging location before delivery to the customer delivery location, and wherein the device is sent to the customer delivery location from the physical staging location;
verifying that the selected network device includes predetermined hardware and software components based at least on the order parameter;
issuing a configuration command to the network device as defined by the network device configuration request; and
sending, to a system of the physical staging location, a status message indicating that the device has been configured and is to be delivered from the physical staging location to the customer delivery location.

14. The system of claim 13, the physical staging location comprising a physical warehouse and a specific geographic location associated with a telecommunications network of a service provider.

15. The system of claim 14, wherein the computing device locates a bay at the physical staging location and verifies that the bay is available for use and in a first position of a queue system.

16. The system of claim 13, wherein an operating system of the network device is modified by the computing device to match specifications predetermined as being optimal to provide a telecommunications service.

17. The system of claim 13, wherein the configuration command is one of a plurality of automated configuration commands issued by the computing device and associated with the network device configuration request to prepare the network device to provide a telecommunications service.

18. The system of claim 13, wherein the network device comprises a new customer premise equipment (CPE), the network device configured with factory settings from a manufacturer before the computing device issues the configuration command.

19. The system of claim 14, wherein the physical staging location is selected by the computing device using a shipping information associated with the physical staging location, the shipping information accessed from one or more shipping computing devices.

20. A non-transitory computer readable storage media storing computer executable instructions for performing a computer process on a computing system, the computer process comprising:
- receiving a device configuration request as part of an order for a telecommunications service, the order comprising an order parameter comprising a customer delivery location associated with delivery of a device;
- selecting, based at least on the order parameter, a staging location to which to send the device to be configured before delivery to the customer delivery location, wherein the device is sent to the staging location before delivery to the customer delivery location, and wherein the device is sent to the customer delivery location from the staging location;
- verifying whether the device comprises predetermined hardware and software specifications;
- issuing a configuration command to the device; and
- sending, to a system of the staging location, a status message indicating that the device has been configured and is to be delivered from the staging location to the customer delivery location.

21. The method of claim 1, further comprising:
- determining that the device has been configured based on the configuration command, wherein sending the status message is based on the determination that the device has been configured.

22. The system of claim 13, the computing device further executing the operations of:
- determining that the network device has been configured based on the configuration command, wherein sending the status message is based on the determination that the network device has been configured.

23. The non-transitory computer readable storage media of claim 20, the computer process further comprising:
- determining that the device has been configured based on the configuration command, wherein sending the status message is based on the determination that the device has been configured.

* * * * *